United States Patent [19]
Watanabe

[11] Patent Number: 5,169,212
[45] Date of Patent: Dec. 8, 1992

[54] REVERSIBLE PROPORTIONING VALVE
[75] Inventor: Shunso F. Watanabe, Livonia, Mich.
[73] Assignee: Ford Motor Company, Dearborn, Mich.
[21] Appl. No.: 631,536
[22] Filed: Dec. 21, 1990
[51] Int. Cl.[5] .............................................. B60T 8/26
[52] U.S. Cl. .................................. 303/9.71; 303/9.72; 303/9.75
[58] Field of Search ...................... 303/9.62, 9.67–9.69, 303/9.71–9.76, 22.1, 22.8, 24.1, 113 AP; 188/349

[56] References Cited
U.S. PATENT DOCUMENTS

| | | | |
|---|---|---|---|
| 3,163,473 | 12/1964 | Stelzer | 303/9.74 |
| 3,217,495 | 11/1965 | Stelzer | 303/9.71 X |
| 3,251,186 | 5/1966 | De Coye De Castelet | 303/9.73 X |
| 3,449,018 | 6/1969 | Males | 303/9.73 |
| 3,479,095 | 11/1969 | Lewis et al. | 303/9.69 |
| 3,503,657 | 3/1970 | MacDuff | 303/9.69 |
| 3,702,207 | 11/1972 | Armstrong | 303/9.69 |
| 3,768,876 | 10/1973 | Lewis | 303/9.69 |
| 3,989,312 | 11/1976 | Unterberg | 303/9.69 |
| 4,113,317 | 9/1978 | Farr | 303/9.73 |
| 4,319,786 | 3/1982 | Nogami | 303/9.68 |
| 4,564,244 | 1/1986 | Reinartz et al. | 303/9.73 |
| 4,603,921 | 8/1986 | Liggett | 303/9.69 |
| 4,650,258 | 3/1987 | Schenten | 303/9.69 |
| 4,659,150 | 4/1987 | Kubota et al. | 303/22.1 X |
| 4,736,990 | 4/1988 | Brown et al. | 303/9.62 X |
| 4,761,041 | 8/1988 | Nagashima et al. | 303/9.62 |
| 4,765,689 | 8/1988 | Rudiger et al. | 303/9.75 X |
| 4,785,847 | 11/1988 | Steer et al. | 137/505.25 |
| 4,821,519 | 4/1989 | Gaiser et al. | 60/591 |

FOREIGN PATENT DOCUMENTS

| | | | |
|---|---|---|---|
| 0096346 | 12/1983 | European Pat. Off. | |
| 2335564 | 1/1974 | Fed. Rep. of Germany | |
| 2929066 | 2/1981 | Fed. Rep. of Germany | |
| 3301902 | 7/1984 | Fed. Rep. of Germany | 303/9.62 |
| 20549 | 2/1983 | Japan | 303/9.74 |
| 160651 | 9/1984 | Japan | 303/9.67 |
| 2133849 | 1/1984 | United Kingdom | |

Primary Examiner—Robert J. Oberleitner
Assistant Examiner—Alfred Muratori
Attorney, Agent, or Firm—Roger L. May; Raymond Coppiellie

[57] ABSTRACT

A reversible proportioning valve allows pressure to the rear brake cylinder of a vehicle to follow pressure to the front brake cylinder in a ratioed relationship, when pressure to the front brake cylinder is decreasing. The reversible proportioning valve of the present invention accomplishes this by enabling ratioed pressure between the front and the rear brakes for both increasing and decreasing pressures, resulting in driver controlled modulation of pressure. The reversible proportioning valve uses a stepped piston/cylinder to control pressure without the use of external power.

6 Claims, 3 Drawing Sheets

REVERSIBLE PROPORTIONING VALVE

BACKGROUND OF THE INVENTION

The present invention relates generally to reversible proportioning valves and, more particularly, to a reversible proportioning valve apparatus and method for controlling pressure without the use of external power.

A variety of reversible proportioning valves have been proposed. Typically, such a valve has a piston cooperating with an internal valve which is normally open to connect the inlet and outlet of the valve, but is closed in response to movement of the piston due to an increase in pressure at the inlet of the valve.

In U.S. Pat. No. 4,319,786, issued to Nogami, a "ball on ramp" valve is used to control the "knee" of the pressure curve. In the brake pressure control device of Nogami, a partition member is assembled within the valve chamber to ensure the precise initial setting of the valve element and is provided with a fluid passage to ensure the optimum control of fluid flow acting on the valve element. However, this type of valve is susceptible to vibrations as well as longitudinal deceleration and, accordingly, has not been successful.

Another reversible proportioning valve is disclosed in U.S. Pat. No. 3,479,095, issued to Lewis et al. The Lewis et al patent discloses a reverse proportioning valve between a pressure generating device and a brake cylinder. The reverse proportioning valve has pressure responsive means with a different area exposed to the actuating pressure than that which is exposed to the pressure of the brake cylinder controlling a tilt valve regulating the bypass of fluid through the reverse proportioning valve. However, the "tilt valve", which is essential to the operation of the Lewis et al proportioning valve, is difficult to execute.

Finally, U.S. Pat. No. 3,449,018, issued to Hales, discloses hydraulic brake control valves having a piston controlling operating movement of an internal valve for cutting off the inlet from the outlet of the control valve. The hydraulic control valves of Hales appear to be reverse proportioning valves in which the piston works within a sleeve which is itself slidable in a bore in the valve body. When the inlet pressure increases, the piston is moved relative to the sleeve to close the internal valve, and thus vary the rate at which pressure is transmitted through the control valve. When the inlet pressure is relieved, outlet pressure is quickly relieved by this placement not only of the piston, but also of the sleeve. However, the hydraulic brake control valves of Hales use a very small check ball to control flow. The small passage associated with the small check valve will restrict the brake application rate.

It is seen then that there is a need for a reversible proportioning valve which is straightforward and easily manufactured, which employs a stepped piston/cylinder to control pressure without the use of external power.

SUMMARY OF THE INVENTION

The present invention meets this need by providing a reversible proportioning valve which employs a stepped piston/cylinder to control pressure without the use of external power. The invention allows pressure to the rear brake cylinder to follow pressure to the front brake cylinder in a ratioed relationship when pressure to the front brake cylinder is decreasing. The reversible proportioning valve of the present invention accomplishes this by enabling ratioed pressure between the front and the rear brakes for both increasing and decreasing pressures, resulting in driver controlled modulation of pressure without an anti-lock brake system. With a conventional proportioning valve installed, when a driver, braking on a dry, paved roadway, anticipates a poor road surface and partially releases the brake, the pressure in the front brakes is reduced but the pressure in the rear brakes remains high causing lock-up when the poorer roadway is encountered. Consequently, the reversible proportioning valve uses a stepped piston/cylinder to control pressure without the use of external power.

The present invention provides a reversible proportioning valve for use with a motor vehicle, the motor vehicle having a front brake cylinder and a rear brake cylinder. In a preferred embodiment of the present invention, the reversible proportioning valve comprises means for supplying pressure to the front brake cylinder and means for supplying pressure to the rear brake cylinder in a ratioed relationship with the means for supplying pressure to the front brake cylinder. Additionally, the reversible proportioning valve further comprises a stepped piston for controlling the means for supplying pressure to the front brake cylinder and the means for supplying pressure to the rear brake cylinder.

In another embodiment of the present invention, a brake pressure control apparatus for use with a motor vehicle comprises a metering piston for acting on a rising pressure and a stepped piston operatively associated with the metering piston for controlling the rising pressure. The stepped piston has a trapped volume and further has a first end acted on by a front brake pressure and a second end acted on by a rear brake pressure. The first end is capable of sensing a reduction in the front brake pressure and the second end is capable of displacing the stepped piston to lower the pressure in the trapped volume in proportion to the reduction in the front brake pressure.

The present invention also provides for a method of controlling brake pressure with a reversible proportioning valve. The method of controlling brake pressure is used with a motor vehicle having a front brake cylinder and a rear brake cylinder. In a preferred embodiment of the present invention, the method comprises the steps of permitting adjustable pressure to the front brake cylinder and permitting adjustable pressure to the rear brake cylinder in a ratioed relationship with the adjustable pressure to the front brake cylinder. The method further comprises the step of providing a stepped piston for controlling the adjustable pressure to the front brake cylinder and the adjustable pressure to the rear brake cylinder. In another embodiment, the present invention provides a method of controlling brake pressure for a motor vehicle, the method comprising the steps of: providing a metering piston for acting on a rising pressure; and providing a stepped piston operatively associated with the metering piston for controlling the rising pressure.

An advantage of the present invention is that it provides for a ratioed pressure between the front and the rear brakes for both increasing and decreasing pressures, resulting in driver controlled modulation of pressure without an anti-lock braking system. The present invention prevents wheel lockup, such as in the situation where a driver braking on a dry, paved roadway anticipates a poor road surface and partially releases the brake, thereby reducing the pressure in the front brake cylinder while pressure in the rear brake cylinder remains high.

Other objects and advantages of the invention will be apparent from the following description, the accompanying drawings, and the appended claims.

DESCRIPTION OF THE PREFERRED EMBODIMENT

Figure 1:
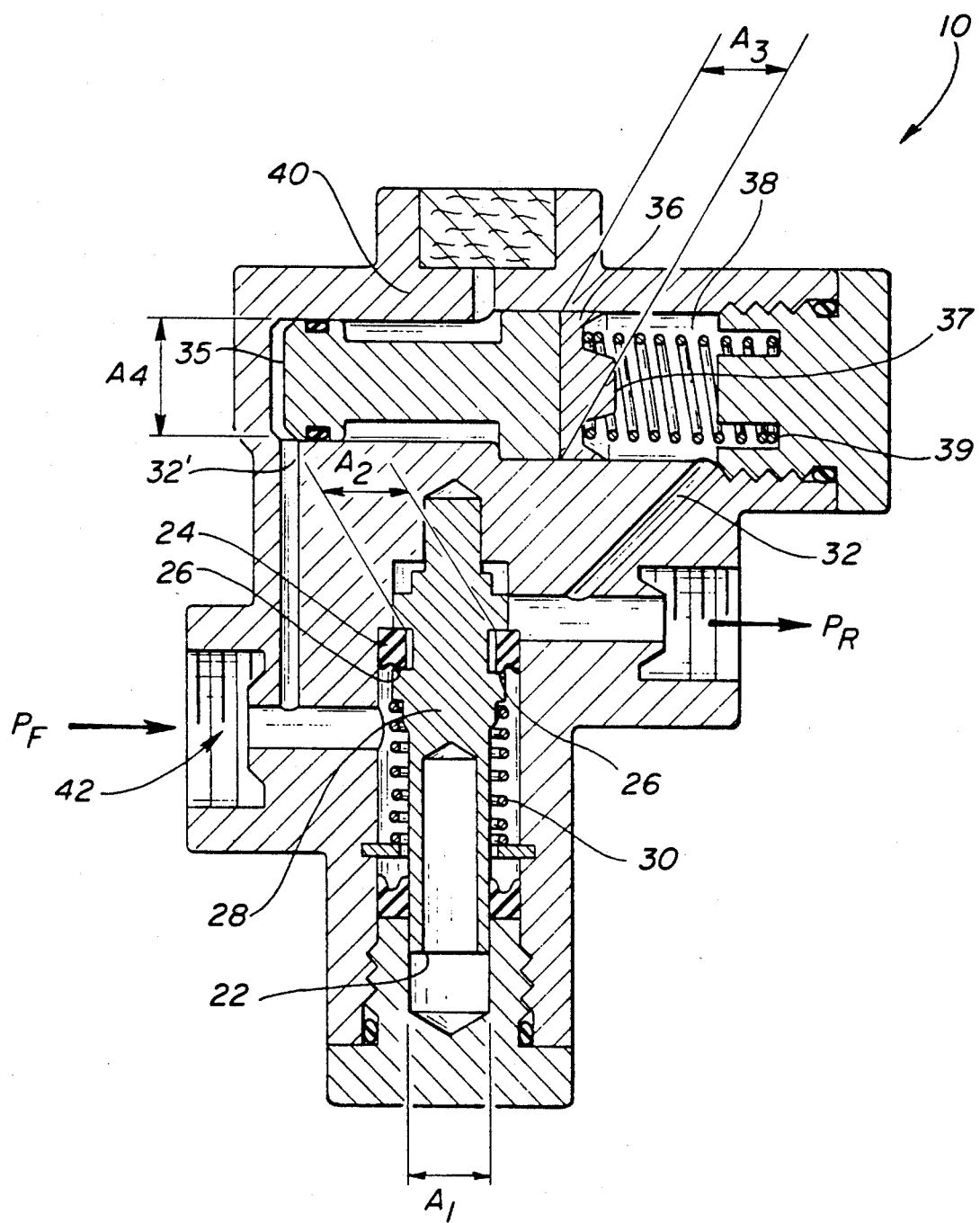
FIG. 1 is a partially cut away view of a reversible proportioning valve of the present invention.
Figure 2:
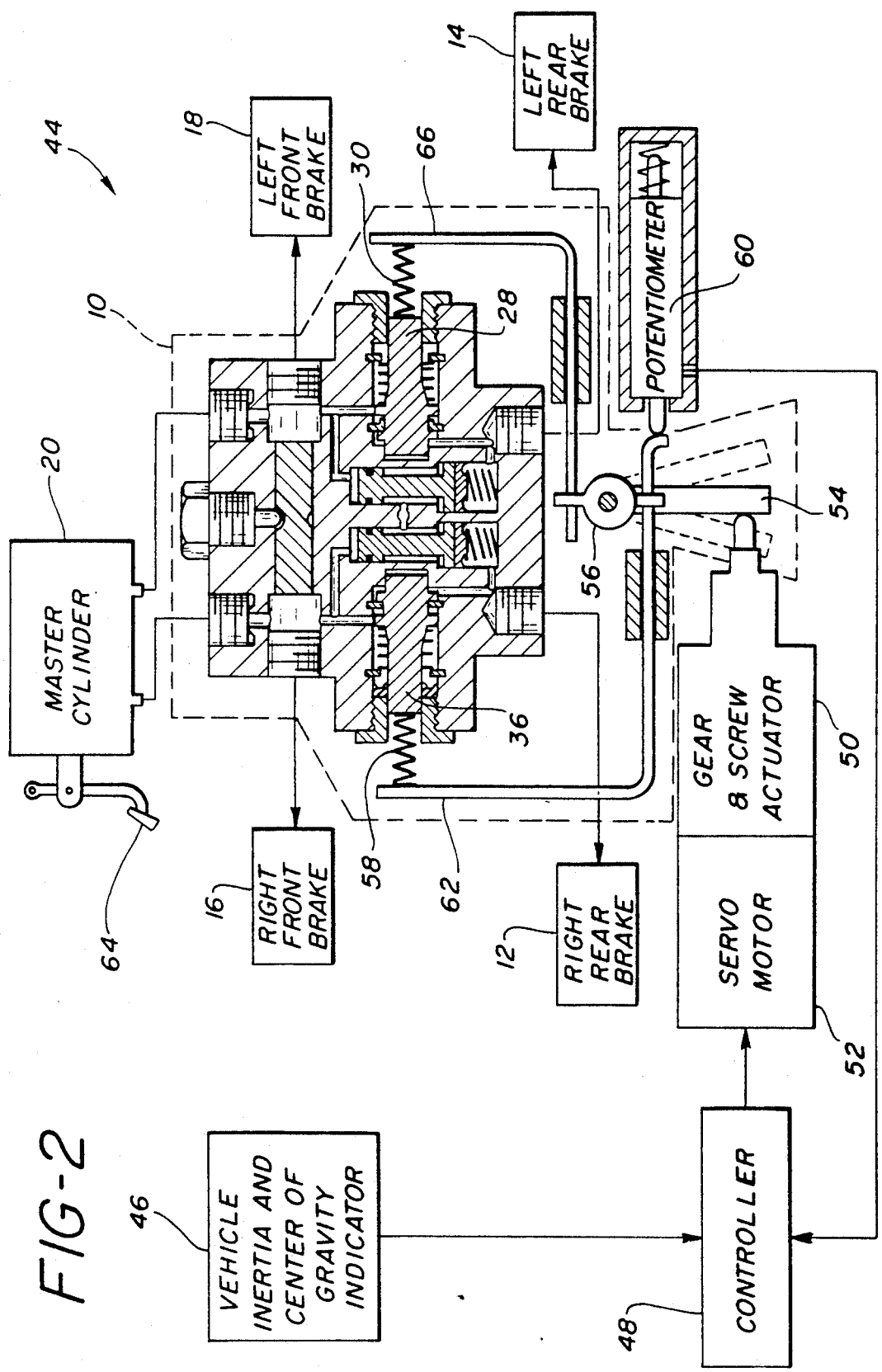
FIG. 2 is a block diagram illustrating control of the reversible proportioning valve of FIG. 1.

Referring now to FIG. 1, reference number 10 refers generally to a brake pressure control apparatus or reversible proportioning valve built upon a basic proportioning valve such as Kelsey-Hayes part number E7499. In FIG. 1, a metering valve pressure ratio defined as a rear brake pressure compared to a front brake pressure, is represented by the equation $$\frac{P_R}{P_F} = \frac{A_2 - A_1}{A_2},$$

where $P_R$ represents pressure to a rear brake cylinder 12 or 14, in FIG. 2; $P_F$ is pressure to a front brake cylinder 16 or 18 from a master cylinder 20, in FIG. 2; $A_1$ is a cross sectional area of lower sliding cylindrical section 22; and $A_2$ is a cross sectional area of an annular seal 24.

As $P_F$ is increased by brake application, brake fluid flows past the underside of the seal 24 between nubs 26 which prevent the closure of metering piston 28, and the opening above the seal 24 caused by the action of a spring 30. When the pressure $P_R$, which is equal to $P_F$, acting on area $A_1$ exceeds the force of spring 30, the metering piston 28 moves down to close passage 32 at the top annulus of the seal 24. As the pressure $P_F$ rises further, the equilibrium $P_R A_2 = P_F(A_2 - A_1)$ is obtained and the ratio $P_r/P_F$ is constant for a rising $P_F$ up to the maximum $P_F$, typically 1100 lbs/in² to 2000 lbs/in².

Figure 3:
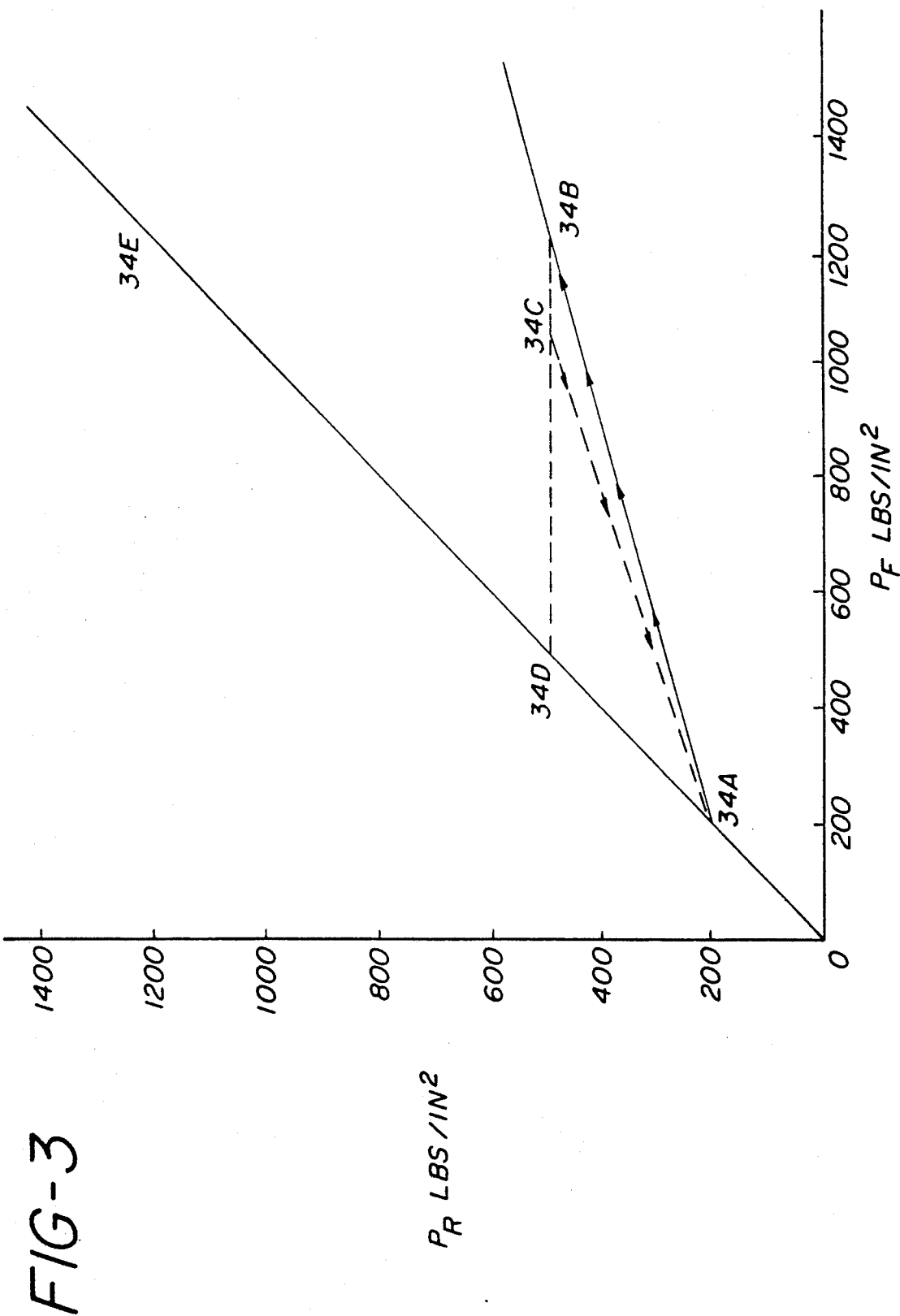
FIG. 3 is a graphical representation of the brake proportioning valve pressure for a vehicle.

When $P_F$ is reduced, the fluid in passage 32 is trapped and a reduction of $P_R$ does not occur until $P_F$ is equal to or less than $P_R$, at which time the spring 30 slides the metering piston 28 upward and the pressures $P_R$ and $P_F$ are equal during further reductions of $P_F$. The pressure is depicted in FIG. 3 by point 34A, the point at which $P_R A_1$ equals the spring 30 force, and points 34B, 34C, and 34D return to 34A. The metering piston 28, therefore, tends to work on pressure rising.

The addition of a stepped piston 36 in the present invention allows the pressure to the rear brake cylinder, $P_R$, to follow pressure to the front brake cylinder, $P_F$, in a ratioed relationship. The stepped piston 36 has a small end 35 and a large end 37. With the stepped piston 36 in operation, the small end 35, acted upon by $P_F$, senses a reduction in the front brake pressure, $P_F$, and shifts to the left, urged by the pressure $P_R$ acting on the large end 37 and a spring 39 in spring chamber 38. The displacement of the stepped piston to the left expands the volume of the fluid trapped in passage 32, resulting in a lowering of the pressure in that trapped volume in proportion to the drop in $P_F$. The pressure trace in this instance is shown on FIG. 3 as traveling from Point 34B to point 34C to point 34A. Force equilibrium occurs according to the equation $$F_S + P_R A_3 = P_F A_4$$

where $F_S$ equals the spring force in chamber 38. When $P_F$ is further decreased until the spring 30 unseats the metering piston 28 from seal 24, $P_R$ is equal to $P_F$.

Typically, when a driver braking on a dry, paved roadway anticipates a poor road surface and partially releases the brake, the pressure in the front brakes is reduced, but the rear brake pressure remains high, causing wheel lockup when the poorer roadway is encountered. However, the present invention prevents this wheel lockup by allowing $P_R$ to follow $P_F$ in a ratioed relationship when $P_F$ is decreasing.

Referring now to FIG. 2 and continuing with FIG. 1, a block diagram 44 is shown to illustrate control of the reversible proportioning valve 10. In one embodiment of the present invention, the proportioning valve 10 can be controlled in accordance with the changing center of gravity and vehicle inertia values, which are supplied by a vehicle inertia and center of gravity indicator 46. A means responsive to the center of gravity estimate for adjusting vehicle parameters is illustrated as controller 48 which operates on the signals produced by the vehicle inertia and center of gravity indicator 46. The controller 48 generates a control signal which actuates, via an actuator mechanism 50, a servo motor or d.c. electric motor 52 to drive a lever 54 to the left when a vehicle is unloaded, or to the right when the vehicle is loaded, as shown by dashed lines.

In FIG. 2, sliders 62 and 66, which are latched to a shaft 56 of the lever 54, compress or release springs 30 and 58, which add to or release the force on the proportioning valve 10 pistons 28 and 36. The movement of the lever 54 to the left or right affects the pressure of the brake fluid supplied to the right rear brake 12, and the left rear brake 14.

A potentiometer 60 in FIG. 2, which is in continual contact with slider 62, indicates the position and, therefore, the amount of force on the pistons 28 and 36 to remove the control signal to the servo motor 52 when the proper piston force is obtained. The reversible proportioning valve 10, the servo motor 52, and the potentiometer 60, are typically located in an engine compartment of a vehicle and are associated with the brake master cylinder 20 and a brake pedal 64. Means responsive to the center of gravity estimate from indicator 46 preferably comprise means for adjusting the proportioning valve 10 of the vehicle to optimally control brake pressure. For example, knowing the center of gravity location and the weight of the vehicle, the controller 48 is programmed to add spring forces acting on the proportioning valve pistons 28 and 36 to adjust the equilibrium of the pressure ratio between the master cylinder 20 and the brakes 12, 14, 16, and 18. However, other embodiments of the present invention can control brake pressure according to means other than vehicle inertia and center of gravity.

Referring now to FIG. 3, a graphical representation of the rear brake pressure versus the front brake pressure of the reversible proportioning valve 10 is illustrated. The pressures are indicated in pounds per square inch. The pressure curve illustrates that the invention allows $P_R$ to follow $P_F$ in a ratioed relationship when $P_F$ is decreasing, by allowing fluid to flow through passage 32 into spring chamber 38. The pressure $P_R$ acting on area $A_3$, which is larger than area A., causes flow out of left hand chamber 40 through passage 32' to port 42 at pressure $P_F$. During this process, the pressure trace on FIG. 3 is from point 34B to point 34C to point 34A.

Without the stepped piston, when $P_F$ is reduced, the fluid in passages 32 and 32' is trapped and a reduction of $P_R$ does not occur until $P_F$ is equal to or less than $P_R$, at which time the spring 30 slides the metering piston 28 upward and the pressures $P_R$ and $P_F$ are equal during further reductions of $P_F$. The pressure is depicted in FIG. 3 by point 34A, the point at which $P_R A_1$ equals the spring 30 force, and points 34B, 34C, and 34D return to point 34A.

Having described the invention in detail and by way of reference to preferred embodiments thereof, it will be apparent that modifications and variations are possible without departing from the scope of the invention which is defined in the appended claims.

What is claimed is:

1. A reversible proportioning valve for use with a motor vehicle, the motor vehicle having a front brake cylinder operated by a front brake pressure, and a rear brake cylinder, the reversible proportioning valve comprising:

means for monitoring said front brake pressure;

means for supplying a rear brake pressure to said rear brake cylinder in a ratioed relationship with said front brake pressure; and a stepped piston for controlling said rear brake pressure when said front brake pressure is decreasing, said stepped piston having an adjustable trapped volume which varies proportionally to a displacement of said stepped piston for controlling said rear brake pressure.

2. A reversible proportioning valve as claimed in claim 1 wherein said means for supplying a rear brake pressure to said rear brake cylinder is applied after said means for supplying pressure to the front brake cylinder has been applied to the proportioning valve.

3. A brake pressure control apparatus for use with a motor vehicle, the motor vehicle having a front brake cylinder operated by a front brake pressure and a rear brake cylinder, the apparatus comprising:

a metering piston for providing a rear brake pressure to said rear brake cylinder in proportion to said front brake pressure when said front brake pressure is increasing; and a stepping piston operatively associated with said metering piston for regulating said rear brake pressure when said front brake pressure is decreasing, said stepped piston having a trapped volume and further having a first end acted on by a front brake pressure and a second end acted on by a rear brake pressure, said first end capable of sensing a reduction in said front brake pressure and said second end capable of displacing said stepped piston to lower pressure in said trapped volume in proportion to said reduction in said front brake pressure and to said displacement of said stepping piston.

4. A method of controlling pressure with a reversible proportioning valve for a motor vehicle having a front brake cylinder and a rear brake cylinder, the method comprising the steps of:

permitting adjustable pressure in the front brake cylinder;

permitting adjustable pressure in the rear brake cylinder in a ratioed relationship with said adjustable pressure to the front brake cylinder; and providing a stepped piston for controlling said adjustable pressure to the rear brake cylinder when said adjustable pressure to the front brake cylinder is decreasing, said stepped piston varying a trapped volume in proportion to a displacement of said stepped piston whereby said adjustable pressure to the rear brake cylinder is reduced.

5. A method of controlling pressure as claimed in claim 4 wherein said step of permitting adjustable pressure in the front brake cylinder further includes the step of supplying pressure to the front brake cylinder from a master cylinder.

6. A method of controlling pressure as claimed in claim 4 wherein said step of permitting adjustable pressure to the rear brake cylinder in a ratioed relationship with said adjustable pressure to the front brake cylinder further comprises the steps of:

supplying pressure to the front brake cylinder from a master cylinder; and applying said pressure from said master cylinder to the proportioning valve.

* * * * *